United States Patent
Corne et al.

(10) Patent No.: US 9,441,980 B2
(45) Date of Patent: Sep. 13, 2016

(54) ROUTE PLANNING

(71) Applicant: BAE SYSTEMS plc, London (GB)

(72) Inventors: David Wolfe Corne, Lothian (GB); Antony James Waldock, Bristol (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/423,574

(22) PCT Filed: Aug. 28, 2013

(86) PCT No.: PCT/GB2013/052247
§ 371 (c)(1),
(2) Date: Feb. 24, 2015

(87) PCT Pub. No.: WO2014/033444
PCT Pub. Date: Mar. 6, 2014

(65) Prior Publication Data
US 2015/0185033 A1 Jul. 2, 2015

(30) Foreign Application Priority Data

Aug. 31, 2012 (GB) .................................. 1215496.9

(51) Int. Cl.
*G01C 21/34* (2006.01)
*G05D 1/02* (2006.01)

(52) U.S. Cl.
CPC ............. *G01C 21/343* (2013.01); *G01C 21/34* (2013.01); *G01C 21/3446* (2013.01); *G05D 1/0217* (2013.01); *G05D 1/0274* (2013.01); *G05D 1/0278* (2013.01)

(58) Field of Classification Search
CPC G01C 21/3446; G01C 21/343; G01C 21/34; G05D 1/0217; G05D 1/0274; G05D 1/0278
See application file for complete search history.

(56) References Cited

U.S. PATENT DOCUMENTS

| 2008/0120027 | A1 | 5/2008 | Cummings | |
|---|---|---|---|---|
| 2008/0275643 | A1* | 11/2008 | Yaqub | G06Q 10/047 701/412 |
| 2009/0125225 | A1* | 5/2009 | Hussain | G01C 21/20 701/416 |
| 2012/0065834 | A1* | 3/2012 | Senart | G07C 5/008 701/31.4 |

FOREIGN PATENT DOCUMENTS

| EP | 1092950 A1 | 4/2001 |
|---|---|---|
| EP | 2273231 A1 | 1/2011 |
| WO | 2014033444 A1 | 3/2014 |

OTHER PUBLICATIONS

International Preliminary Report on Patentability and Written Opinion received for Patent Application No. PCT/GB2013/052247, mailed on Mar. 12, 2015. 6 pages.

(Continued)

*Primary Examiner* — Yuen Wong
(74) *Attorney, Agent, or Firm* — Finch & Maloney PLLC

(57) ABSTRACT

Methods and apparatus for determining a route for a vehicle (2), the method comprising: providing a set of routes, each route from a starting location to a terminal location and determined using a first algorithm; acquiring, by a processor (6), a starting location (A); acquiring, by the processor (6), a terminal location (B); using the starting and terminal locations, selecting, by the processor (6), one or more routes from the provided set of routes dependent upon the starting location (A) and the terminal location (B); and, using the acquired starting and terminal locations, and the selected routes, performing, by the processor (6), a second algorithm to determine a route for the vehicle (2) from the starting location (A) to the terminal location (B), the second algorithm comprising an optimization process (with respect to certain objectives) using the selected routes as at least part of an initiator set of routes.

15 Claims, 6 Drawing Sheets

(56) References Cited

OTHER PUBLICATIONS

International Search Report and Written Opinion received for Patent Application No. PCT/GB2013/052247, mailed on Dec. 5, 2013. 8 pages.

GB Intellectual Property Office Search Report under Section 17(5) received for GB Patent Application No. 1215496.9 mailed Dec. 21, 2012. 3 pages.

* cited by examiner

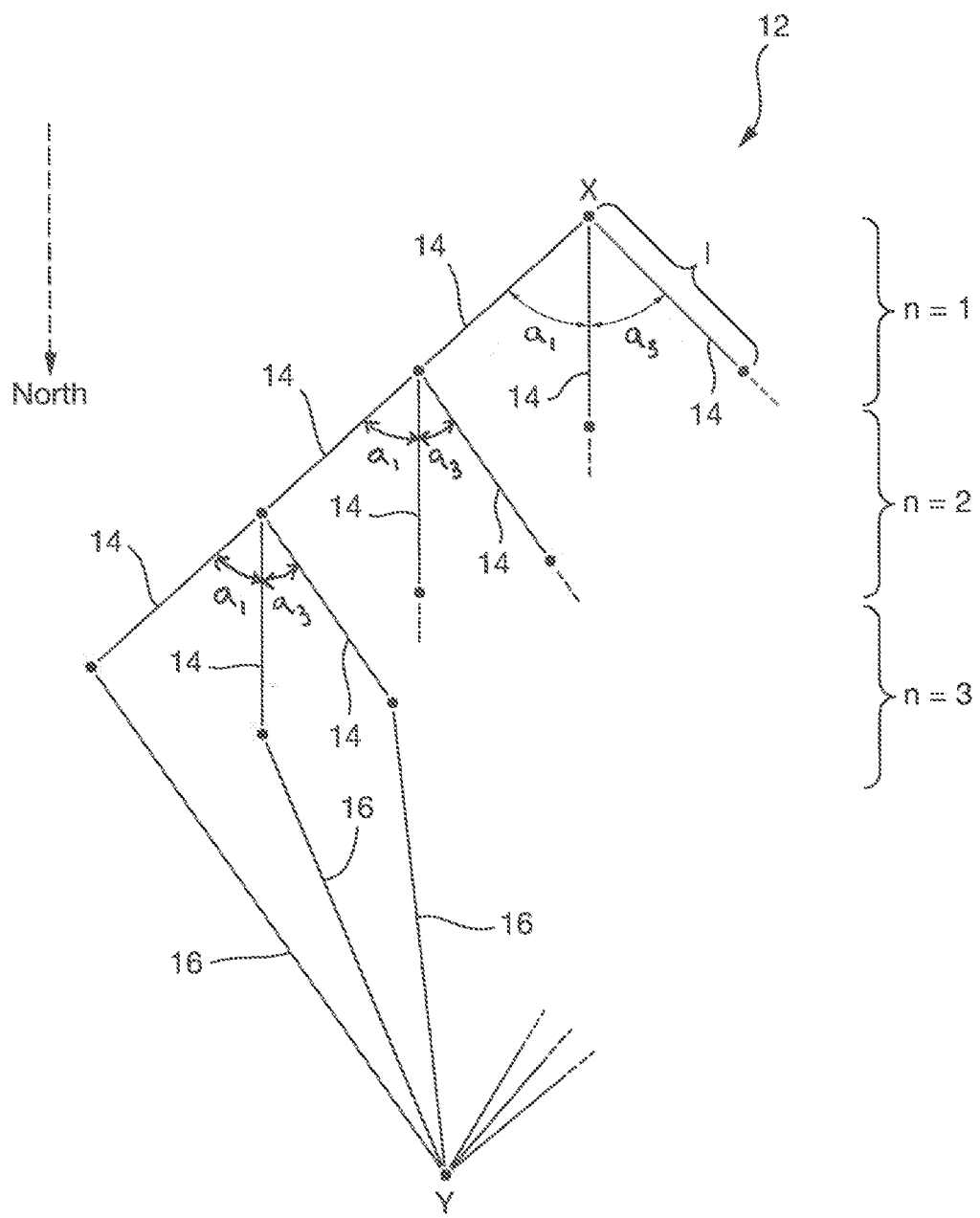

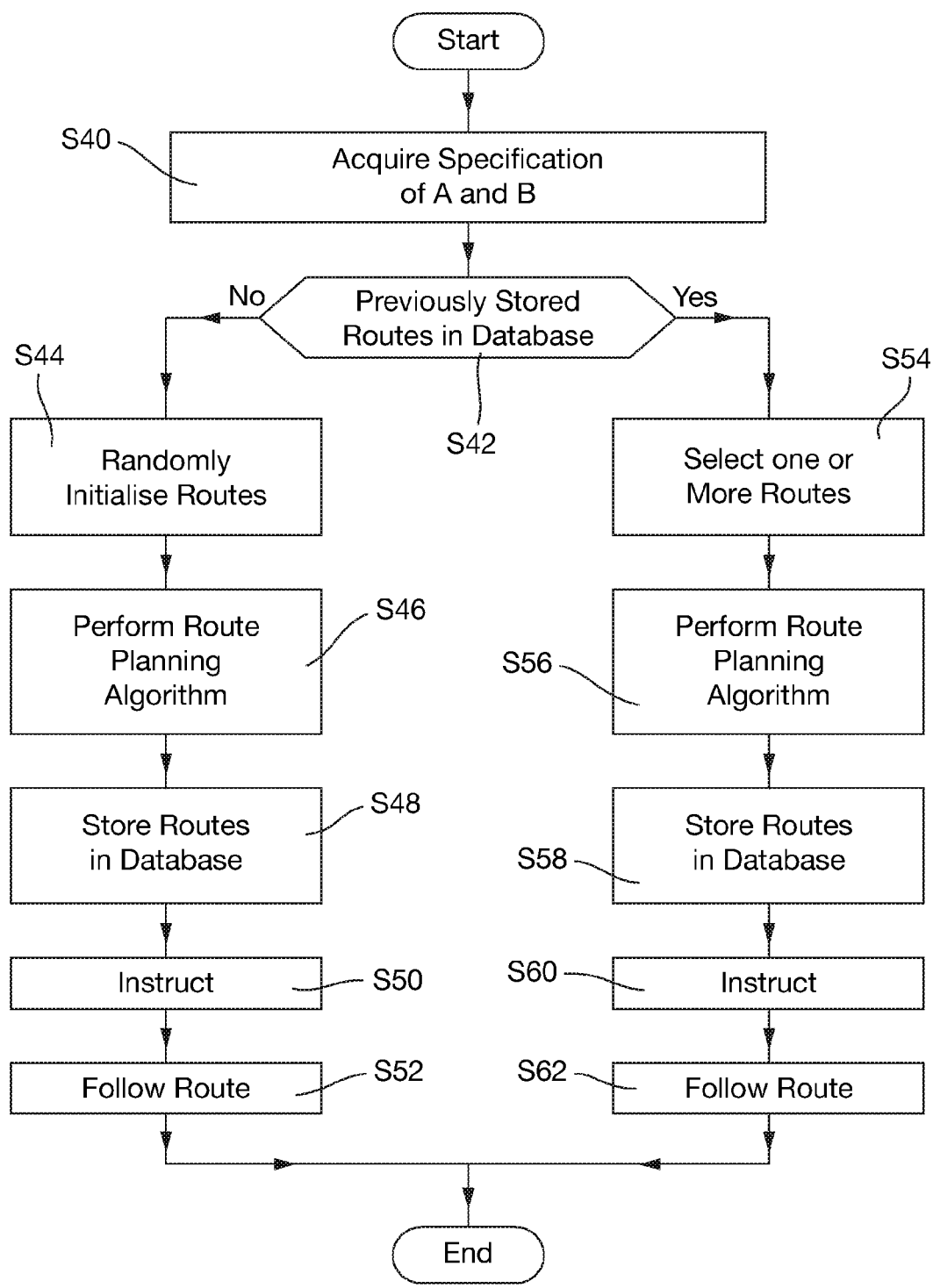

ROUTE PLANNING

FIELD OF THE INVENTION

The present invention relates to determining routes for vehicles.

BACKGROUND

Route planning algorithms (e.g. multi-objective optimization (MOO) route planning approaches) may be used to determine routes for vehicle. For example, a route planning algorithm may be used to determine a route for an autonomous land-based vehicle over a complex unstructured area of terrain.

Typically, route planning algorithms are initiated using one or more initial routes, which may be known as a "seed set" of routes. Many route planning algorithms comprise performing an iterative optimization process using the seed set to optimize those routes with respect to some parameters (e.g. fuel usage, travel time etc.).

Conventionally, the routes that form the seed set are randomly generated or selected routes.

SUMMARY OF THE INVENTION

In a first aspect, the present invention provides a method of determining a route for a vehicle, the method comprising providing a set of routes, each route in the set of routes being a pre-determined route from a starting location to a terminal location, at least one route (e.g. each route) in the set of routes having been determined using a first route planning algorithm, acquire information specifying a starting location for the vehicle, acquiring information specifying a desired terminal location for the vehicle, using the acquired starting location information and the acquired desired terminal location information, selecting, by one or more processors, one or more routes from the provided set of routes, the selection of a route from the set of routes being dependent upon the identified starting location and the identified desired terminal location, and, using the acquired starting location information, the acquired desired terminal location information, and the selected one or more routes, performing, by the one or more processors, a second route planning algorithm to determine a route for the vehicle, the determined route for the vehicle being a route from the starting location to the desired terminal location, the second route planning algorithm comprising performing an optimization process using the selected one or more routes as at least part of an initial set of routes for the optimization process (i.e. a seed set), the optimization process being performed such that optimization is performed with respect to one or more objectives.

The method may further comprise providing, by the one or more processors, for use by the vehicle, information specifying the determined route for the vehicle.

The method may further comprise following, by the vehicle, the determined route for the vehicle.

The step of providing the set of routes may comprise performing the first route planning algorithm to determine the set of routes.

The first route planning algorithm may comprise defining a plurality of points within a region, the region being a region within which the vehicle may move, and for each pair of the defined points, constructing one or more routes between that pair of points. The provided set of routes may comprise some or all of the constructed routes.

Each constructed route between a pair of points may comprise a plurality of substantially straight route sections connecting that pair of points.

For each pair of the defined points, more than one route may be constructed.

The first route planning algorithm may further comprise, for each pair of the defined points, selecting, from the more than one routes constructed for that pair of points, those routes that are Pareto optimal with respect to one or more further objectives. The provided set of routes may comprise the selected Pareto optimal routes.

The one or more further objectives may comprise one or more objectives selected from the group of objectives consisting of: minimising an amount of fuel that would be used by the vehicle to travel a route, minimising an amount of time it would take the vehicle to travel a route, and minimising a likelihood that the vehicle would be detected by an entity remote from the vehicle whilst following the route.

The set of routes may further comprise at least one route that has been determined using the second route planning algorithm. The first route planning algorithm and the second route planning algorithm may be different route planning algorithms.

The first route planning algorithm may be the same as the second route planning algorithm.

The set of routes may comprise one or more routes determined using the second route planning algorithm at an earlier point in time relative to the point in time for which the route for the vehicle from the specified starting location to the specified desired terminal location is determined.

The step of selecting one or more routes from the provided set of routes may be performed such that each of the selected routes satisfies one or more criteria selected from the group of criteria consisting of: the criterion that the starting location of a selected route is closer to the specified starting location for the vehicle than the starting location each unselected route, and the criterion that the terminal location of a selected route is closer to the specified desired terminal location for the vehicle than the terminal location each unselected route.

In a further aspect, the present invention provides a route planner for determining a route for a vehicle, the route planner comprising a database configured to store a set of routes, each route in the set of routes being a route from a starting location to a terminal location, at least one route in the set of routes having been determined using a first route planning algorithm, and a processor operatively coupled to the database and configured to acquire information specifying a starting location for the vehicle, acquire information specifying a desired terminal location for the vehicle, using the acquired starting location information and the acquired desired terminal location information, select one or more routes from the set of routes stored in the database, the selection of a route from the set of routes being dependent upon the identified starting location and the identified desired terminal location, and using the acquired starting location information, the acquired desired terminal location information, and the selected one or more routes, perform a second route planning algorithm to determine a route for the vehicle, the determined route for the vehicle being a route from the starting location to the desired terminal location, the second route planning algorithm comprising performing an optimization process using the selected one or more routes as at least part of an initial set of routes for the optimization process, the optimization process being performed such that optimization is performed with respect to one or more objectives.

In a further aspect, the present invention provides a computer program or plurality of computer programs arranged such that when executed by a computer system it/they cause the computer system to operate in accordance with the method of any of the above aspects.

In a further aspect, the present invention provides a machine readable storage medium storing a computer program or at least one of the plurality of computer programs according to the preceding aspect.

BRIEF DESCRIPTION OF THE DRAWINGS

FIG. 5 is a schematic illustration (not to scale) showing an example graph that defines a plurality of routes; and FIG. 6 is a process flow chart showing certain steps of a further embodiment of a process of moving a vehicle from one point to another.

DETAILED DESCRIPTION

Figure 1:
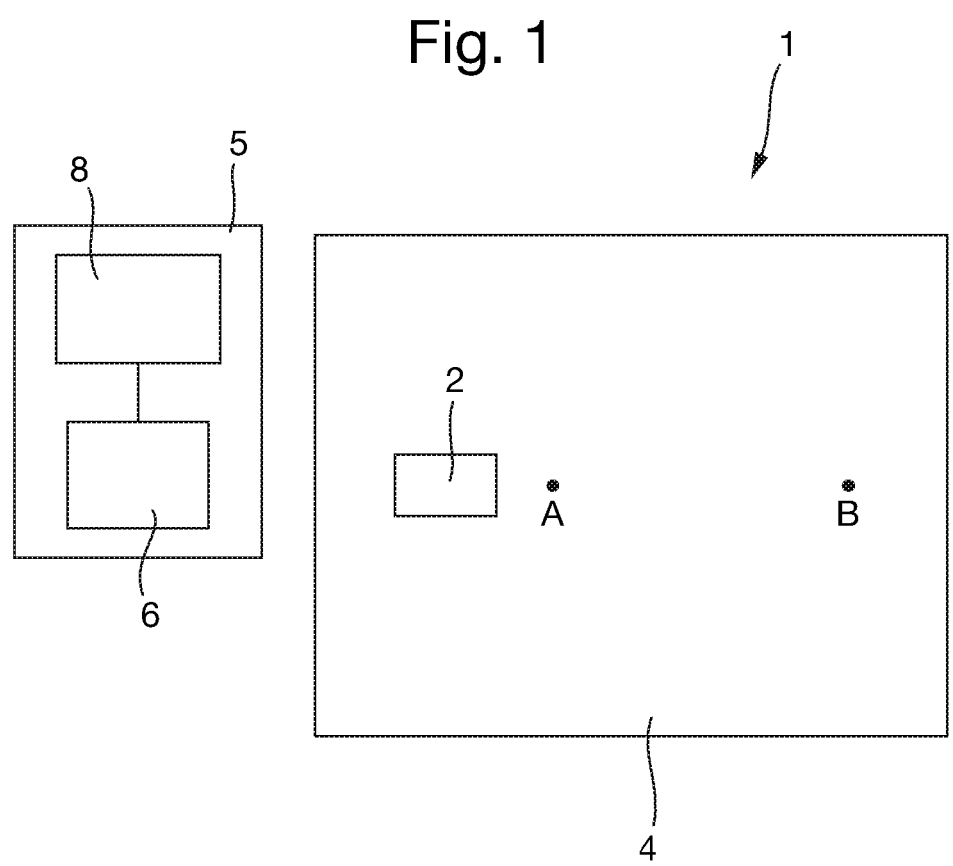
FIG. 1 is a schematic illustration (not to scale) showing an example scenario in which embodiments of a route planning method are to be implemented.

In the following description, like reference numerals refer to like elements.

The following description is based on embodiments of the invention and should not be taken as limiting the invention with regard to alternative embodiments that are not explicitly described herein.

Apparatus for implementing any of the below described arrangements, and performing any of the below described method steps, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the below described process flowcharts may be omitted or such process steps may be performed in differing order to that presented below and shown in those process flowcharts. Furthermore, although all the process steps have, for convenience and ease of understanding, been depicted as discrete temporally-sequential steps, nevertheless some of the process steps may in fact be performed simultaneously or at least overlapping to some extent temporally.

Referring now to the FIGS., FIG. 1 is a schematic illustration (not to scale) showing an example scenario 1 in which embodiments of a route planning method are to be implemented.

In this scenario 1, an unmanned ground-based vehicle 2 is to travel with an area of terrain 4 from a first point (point A) in the area of terrain 4 to a second point (point B) in the area of terrain 4. The route to be travelled by the vehicle 2 (i.e. the route from point A to point B) is to be determined by a route planner 5.

In this embodiment, the route planner 5 comprises a processor 6 which is coupled to a database 8. This connection is such that information may be sent from the processor 6 to the database 8 and vice versa.

Figure 2:
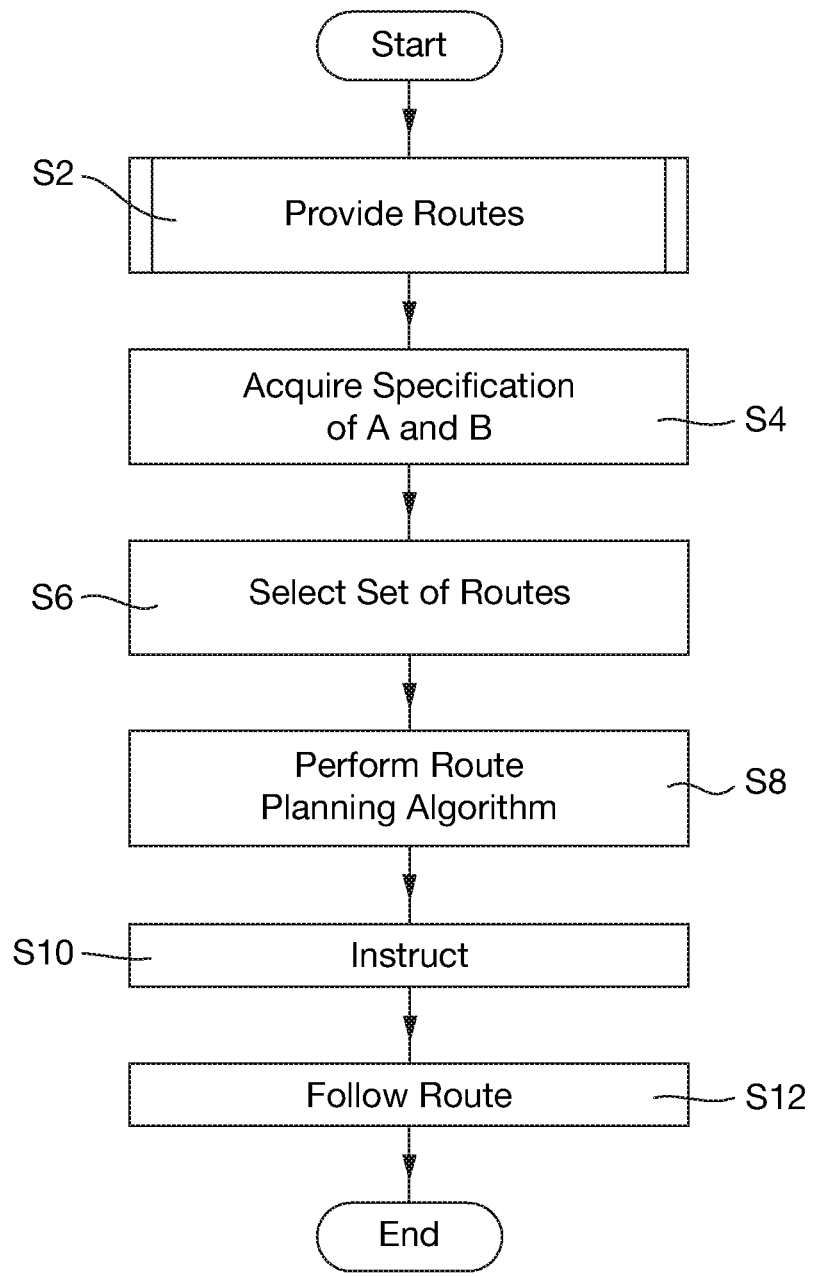
FIG. 2 is a process flow chart showing certain steps of an embodiment of a process of moving a vehicle from one point to another.

FIG. 2 is a process flow chart showing certain steps of an embodiment of a process of moving the vehicle 2 from point A to point B. This process comprises planning a route between points A and B for the vehicle 2.

At step s2, a plurality of routes is provided for use by the route planner 5.

In this embodiment, the providing of the plurality of routes comprises the route planner 5 determining a plurality of routes. The process of determining the set of routes used in this embodiment is described in more detail later below with reference to FIG. 3.

As described in more detail later below with reference to FIG. 3, each route in the provided plurality of routes is a route between a pair of points in the area of terrain 4. Also, for each pair of points in the area of terrain 4, a set of routes between those points is provided. Furthermore, for each pair of points within the area of terrain 4, the set of routes is a "Pareto optimal set" of routes (selected from a larger set of routes) between those points. Each route in the Pareto optimal set is a route that has a Pareto optimal (or Pareto efficient) trade-off between two different parameters. Examples of such parameters include, but are not limited to, the amount of fuel that would be used by the vehicle to travel the route, the amount of time it would take the vehicle 2 to travel the route, the likelihood that the vehicle 2 is detected whilst following the route etc. The Pareto optimal set of routes for a pair of points within the area of terrain 4 comprises routes between that pair of points that are not dominated by another route in that Pareto optimal set. A first route may be considered to be not dominated by a second route if and only if the first route is at least as good as the second route (with respect to the objectives being taken into account), and the first route is strictly better than the second route with respect to at least one of those objectives.

Thus, in this embodiment, at step s2 a plurality of routes (comprising a

Pareto optimal set of routes for each of a plurality of pairs of points within the area of terrain 4) is provided.

In this embodiment, the plurality of routes provided for use by the route planner 4 is stored by the route planner in the database 8.

At step s4, the point from which the vehicle 2 is to travel (i.e. point A, which may, for example, be a current location of the vehicle 2 within the area of terrain 4) is acquired by the processor 6 of the route planner 5. Also, the point to which the vehicle 2 is to travel (i.e. point B, which may, for example, be a desired destination of the vehicle 2 within the area of terrain 4) is acquired by the processor 6 of the route planner 5.

In this embodiment, points A and B are acquired by the route planner 5 by the route planner 5 receiving (e.g. from an operator or user of the vehicle 2) information specifying the points A and B. In other embodiments, either or both of the points A and B may be acquired by the route planner 5 in a different appropriate way, for example, the processor 6 may determine one or more the points A and B (e.g. a current position of the vehicle 2 may be determined using Global Positioning System measurements of the vehicle 2).

The start and end locations (i.e. point A and B) may be defined using a latitude, a longitude, and a heading (e.g. from true North).

At step s6, from the plurality of routes stored in the database 8 at step s2, the processor 6 selects one of the Pareto optimal set of routes that make up the plurality of routes stored in the database 8. In this embodiment, the processor 6 selects the Pareto optimal set of routes whose start and end points best match points A and B respectively.

Any appropriate selection algorithm may be used by the processor 6 to select one (or more) of the Pareto optimal set of routes. For example, a Pareto optimal set of routes may be selected such that the routes of that selected Pareto optimal set satisfy one or both of the criteria that: (i) the starting location of the routes in the selected Pareto optimal set more closely match (i.e. are closer to) point A than a starting location of the routes in a different (unselected) Pareto optimal; and (ii) the terminal/ending location of the routes in the selected Pareto optimal set more closely match (i.e. are closer to) point B than a terminal/ending location of the routes in a different (unselected) Pareto optimal. Also, a Pareto optimal set of routes may be selected, e.g., based on the minimum straight line distance between the locations A and B and the start and end for each route in the database.

At step s8, using the selected Pareto optimal set of routes (i.e. the Pareto optimal set of routes whose start and end points most closely match points A and B respectively), the processor 6 performs a route planning algorithm to determine one or more routes (e.g. "optimal" routes relative to certain parameters) for the vehicle 2 between point A and point B.

In this embodiment, the selected Pareto optimal set of routes is used as a "seed set" for the route planning algorithm. In other words, the selected Pareto optimal set of routes is used to as initial routes for the route planning algorithm. In other words, the selected Pareto optimal set of routes is used to initiate the route planning algorithm.

In this embodiment, any appropriate route planning algorithm (e.g. any appropriate route planning algorithm for which one or more initial routes are to be specified) may be used to determine a route for the vehicle 2 between point A and point B. For example, a Multi-Objective Optimization Algorithm such as a Multi-Objective Evolutionary Algorithm (MOEA), a Multi Objective Evolutionary Algorithm based on Decomposition (MOEA/D), a Speed-constrained Multi-Objective Particle Swarm Optimization (SMPSO) algorithm, or a Non-dominated Sorting Genetic Algorithm II (NSGA-II) may be used. Further information on appropriate route planning algorithms may be found in, for example, Li, H., Zhang, Q.: Multiobjective optimization problems with complicated Pareto sets, moea/d and nsgaii. IEEE Trans. Evolutionary Computation (2008 ), which is incorporated herein by reference. Further information on appropriate route planning algorithms may be found in, for example, Nebro, A., Durillo, J., Garć ia-Nieto, J., Coello Coello, C., Luna, F., Alba, E.: Smpso: A new pso-based metaheuristic for multi-objective optimization, In: 2009 IEEE Symposium on MCDM, IEEE (2009) 66-73, which is incorporated herein by reference. Further information on appropriate route planning algorithms may be found in, for example, Deb, K., Pratap, A., Agarwal, S., Meyarivan, T.: A fast elitist multi-objective genetic algorithm: Nsga-ii. IEEE Trans on Evol. Comp. 6 (2000) 182-197, which is incorporated herein by reference.

Thus, one or more routes within the area of terrain 4 from point A to B for the vehicle 2 is determined.

At step s10, the route planner 5 may instruct the vehicle 2 to follow a route determined at step s8. For example, the route planner 5 may send information specifying a determined route to the vehicle 2.

At step s12, using the received instructions, the vehicle 2 may follow a determined route, thereby moving from point A to point B.

Thus, a process of moving the vehicle 2 from point A to point B is provided.

Figure 3:
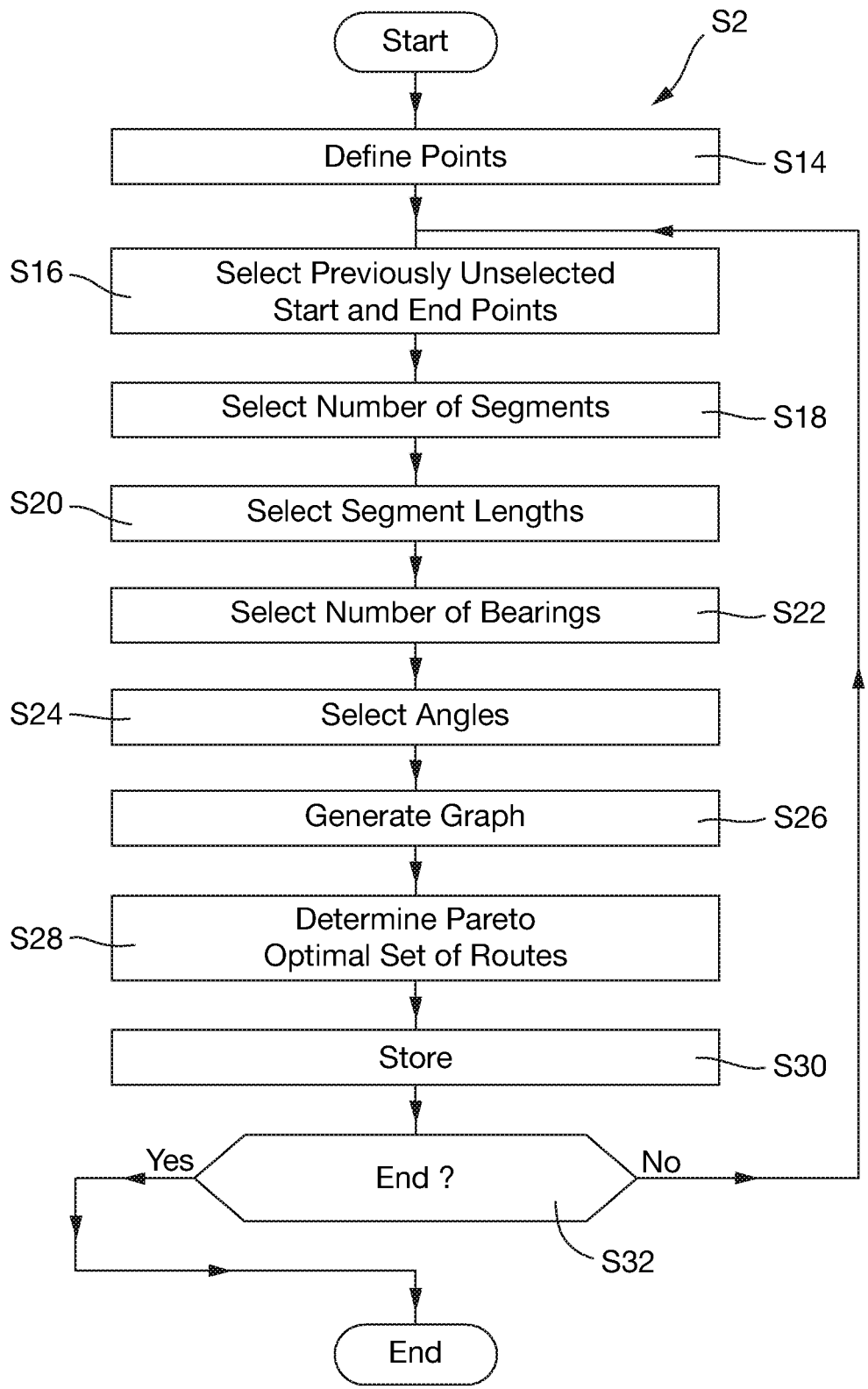
FIG. 3 is a process flow chart showing certain steps of an example process of determining a set of routes.

FIG. 3 is a process flow chart showing certain steps of an example process of determining a set of routes, as may be performed by the route planner 5 at step s2 of the process of FIG. 2.

At step s14, the processor 6 defines a set of points within the area of terrain 4. This defining of a set of points within the area of terrain 4 may be performed using any appropriate process. For example, the processor 6 may define a mesh over the area of terrain 4 and then define, as the set of points within the area of terrain 4, points on this mesh. There may be any appropriate number of points defined within the area of terrain 4. Also, the density of the points within the area of terrain 4 may be any appropriate density. The density of the points within the area of terrain 4 may be dependent on the data sources sizes.

Figure 4:
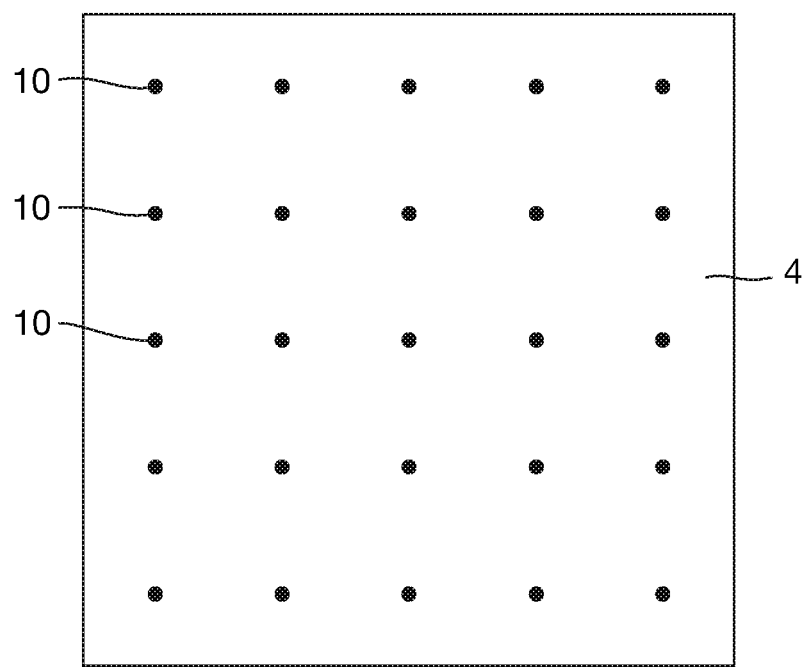
FIG. 4 is a schematic illustration (not to scale) showing an area of terrain and an example set of points 10 defined thereon.

FIG. 4 is a schematic illustration (not to scale) showing the area of terrain and an example set of points 10 defined within the area of terrain 4.

At step s16, the processor 6 selects a previously unselected pair of points from the defined set of points 10. The previously unselected pair of points are hereinafter referred to as point X and point Y.

Steps s18 to s26 describe a process of generating a graph that defines a plurality of routes between the points selected at step s16 (i.e. between point X and point Y). In this embodiment, each of the routes between point X and Y that are defined by the generated graph comprises a number of substantially straight segments.

At step s18, the processor 6 specifies a number of segments that each of the routes between point X and point Y (that are to generated) is to include. In this embodiment, the number of segments specified at step s18 is n.

At step s20, the processor 6 specifies a length for the route segments. In this embodiment, the segment length specified at step s20 is l.

At step s22, the processor 6 specifies a number of bearings. Further information relating to this bearing number is given later below with reference to the description of step s26 and FIG. 5. In this embodiment, the bearing number specified at step s22 is m.

At step s24, the processor 6 specifies an angle. In this embodiment, an angle is specified for each bearing (the number of which was specified at step s22). In other words, at step s24, the processor 6 specifies m angles. In this embodiment, angles specified at step s24 are $a_1, a_2, \ldots, a_m$. Each of the angles $a_1, a_2, \ldots, a_m$ may be an angle of a bearing from true North, from the heading of the vehicle 2, or from any other reference direction. In this embodiment, each of the angles $a_1, a_2, \ldots, a_m$ is an angle of a bearing from true North. In some embodiments, the bearings may be measured from a straight line connecting the vehicle's current location (i.e. point A) to the vehicle's desired terminal location (i.e. point B).

At step s26, using the specified number of segments n, segment length l, bearing number m, and bearing angles $a_1, a_2, \ldots, a_m$, the processor constructs a graph comprising a plurality of routes between point X and point Y.

FIG. 5 is a schematic illustration (not to scale) showing an example graph 12 constructed by the processor 6 at step s26.

The graph 12 may be constructed as follows.

Starting at point X, m segments 14 are drawn, each of the m segments 14 extending from point X to a new point. In the graph 12 of FIG. 5, the bearing number m=3. Thus, three segments 14 each extend from point X to a respective "new point". The direction of each of the segments 14 relative to true North (which is indicated in FIG. 5 by a dotted arrow) is a different angle from the specified set of angles $a_1$, $a_2, \ldots, a_m$. In the graph 12 of FIG. 5, the angles of the three segments 14 extending from point X are $a_1$, $a_2$ and $a_3$ respectively. The length of each of the segments 14 is equal to l.

Using each free end of a segment 14 (e.g. the "new point") as a starting point, the process of drawing m segments of length 1 with directions $a_1, a_2, \ldots, a_m$ is then repeated (or iterated). Thus, a plurality of routes, each route comprising two segments 14, is created.

This process is repeated (or iterated) until a plurality of routes, each route comprising n segments 14, is created. In the graph 12 of FIG. 5, n=3. Thus, each route comprises three segments 14 of length l.

Finally, each free end of a segment 14 is connected by a further segment 16 to the point Y. Thus, graph 12 is generated. The graph 12 defines a plurality of routes (in particular $m^n$ routes). Each of the routes is from the point X to the point Y. Also, each route comprises n segments 14 of length l, and one further segment 16 (which may have a different length).

Returning now to the description of FIG. 3, at step s28, the processor 6 determines a Pareto optimal set of routes from the set of routes defined by the generated graph 12. The Pareto optimal set of routes from X to Y comprises all those routes (from the set of routes defined by the graph 12 of routes from X to Y) that has a Pareto optimal (or Pareto efficient) trade-off between two different appropriate parameters (e.g. fuel use, travel time, etc.)

Any appropriate process may be used to determine the Pareto optimal set of routes from the set of routes defined by the generated graph 12. For example, a multi-objective extension to an A* algorithm, known as New Approach to Multi-Objective A* (NAMOA*), may be used. Further information on the A* algorithm may be found, for example, in Hart, P. E.; Nilsson, N. J.; Raphael, B. (1968). "A Formal Basis for the Heuristic Determination of Minimum Cost Paths". IEEE Transactions on Systems Science and Cybernetics, SSC4 4 (2): 100-107. doi:10.1109/TSSC.1968.300136, which is incorporated herein by reference. Further information on the NAMOA* algorithm may be found, for example, in Mandow, L., de-la Cruz, J. L .P.: "Multiobjective A* search with consistent heuristics", J. ACM 57(2010). which is incorporated herein by reference.

Another example of an appropriate process for determining the Pareto optimal set of routes from the set of routes defined by the generated graph 12 may include Dijstra's Algorithm. Further information on Dijstra's Algorithm may be found, for example, in Dijkstra, E. W. (1959). "A note on two problems in connexion with graphs". Numerische Mathematik 1: 269-271. doi:10.1007/BF01386390, which is incorporated herein by reference.

Another example appropriate process for determining the Pareto optimal set of routes from the set of routes defined by the generated graph 12 may include D*. Further information on D* may be found, for example, in Stentz, Anthony (1994), "Optimal and Efficient Path Planning for Partially-Known Environments", Proceedings of the International Conference on Robotics and Automation: 3310-3317, which is incorporated herein by reference.

At step s30, the Pareto optimal set of routes from point X to point Y (that are determined by the processor 6 at step s28) are stored by the processor 6 in the database 8.

At step s32, it is determined whether or not the process of FIG. 3 should end.

Determining whether or not the process of FIG. 3 should end or not may be dependent upon any appropriate criteria. For example, it may be determined that the process should end if a Pareto optimal set of routes for each pair of the points 10 that were defined at step s14 (i.e. each pair of the points 10 in the area of terrain 4 shown in FIG. 4) has been determined. Also for example, it may be determined that the process should end if the time for which the process has been performed exceeds a threshold time.

If, at step s32, it is determined that the process of FIG. 3 should be ended, the process of FIG. 3 is ended.

However, if at step s32, it is determined that the process of FIG. 3 should not be ended, the process of FIG. 3 proceeds back to step s16 (whereat a previously unselected pair of points 10 is selected).

Thus, the process of FIG. 3 may be performed until a Pareto optimal set of routes (with respect to some appropriate parameters) is determined for each different pair of points 10 that is defined at step s14.

Thus, an example of a process of determining a set of routes, as may be performed by the route planner 5 at step s2 of the process of FIG. 2, is provided.

The above described methods and apparatus advantageously tend to provide that prior information (i.e. previously determined routes, i.e. Pareto optimal sets of relatively "course-grained" routes between points) is exploited. This prior information may advantageously be used as starting routes (i.e. a seed set of routes) for a route planning algorithm. Using such routes as a seed set for a route planning algorithm advantageously tends to provide that the route planning algorithm determines an "optimal"0 route faster than if randomly routes were used as a seed set. In other words, the described methods and apparatus advantageously tend to increase the speed of optimization for a route planning algorithm, and therefore speed up the route planning process.

The above described methods and apparatus advantageously tend to be capable of exploiting knowledge about the broad geographic area in which a route is to be planned (i.e. the area of terrain 4) to determine routes which may be selected as a seed set of routes for the route planning algorithm (i.e. the aforementioned prior information). Furthermore, the above described methods and apparatus advantageously tend to be capable of exploiting knowledge about terrain characteristics of the area of terrain 4 to determine routes which may be selected as a seed set of routes for the route planning algorithm (i.e. the aforementioned prior information).

When determining a route between point A and point B, the above described methods and apparatus advantageously tend to use, as a seed set for the route planning, approximations of "optimal routes" between points A and B, or between points that are deemed to be close to A and B. In other words, relatively "course" Pareto optimal routes between A and B that have been selected from a larger set of relatively "course-grained" routes between A and B are advantageously used as a seed set of routes for the route planning algorithm.

A further advantage provided by the above described methods and apparatus is that Pareto optimal "course-grained" route solutions for a relatively large collection of potential start and end locations within the area of terrain 4 may be determined. Thus, when a specification of the locations between which a route is to be planned (i.e. points A and B) is acquired by the route planner 5, it tends to be possible to select from the prior information (i.e. the relatively large collection of previously determined routes) an appropriate seed set.

The above described method and apparatus advantageously tend to produce routes for the vehicle 2 that are closer to the Pareto optimal front for the route planning problem.

A further advantage provided by the above described methods and apparatus is that the optimization process may be deterministic. This tends to be particularly advantageously for safety critical systems like unmanned systems.

FIG. 6 is a process flow chart showing certain steps of a further embodiment of a process of moving the vehicle 2 from point A to point B. This process comprises planning a route between points A and B for the vehicle 2.

At step s40, the point from which the vehicle 2 is to travel (i.e. point A) is acquired by the processor 6 of the route planner 5. Also, the point to which the vehicle 2 is to travel (i.e. point B) is acquired by the processor 6 of the route planner 5. This process may be performed, for example, in the same way as that described above with reference to step s4 of the process of FIG. 2.

At step s42, the processor may determine whether or not the database 8 contains any previously stored routes.

If, at step s42, it is determined that the database 8 does not contain any previously stored routes, the process of FIG. 6 proceeds to step s44.

However, if, at step s42, it is determined that the database 8 does contain previously stored routes, the process of FIG. 6 proceeds to step s54. Step s54 will be described in more detail later below after the description of steps s44 to s52.

At step s44, a set of routes is generated. In this embodiment each of these routes is a randomly generated route from A to B. This set of routes is hereinafter referred to as the "randomly generated routes".

In other embodiments, a set of routes may be generated in a different way. For example, in other embodiments, the "generation" of a set of routes performed at step s44 may comprise selecting a set of routes from a plurality of previously determined routes e.g. selecting (from a plurality of previously determined routes stored in the database 8) a Pareto optimal set of "course-grained" routes start and end points that are similar to A and B, as described in a previous embodiment earlier above with reference to FIGS. 2 and 3.

At step s46, using the randomly generated routes, the processor 6 performs a route planning algorithm to determine one or more routes (e.g. "optimal" routes relative to certain parameters) for the vehicle 2 between point A and point B.

In this embodiment, at step s46, the randomly generated routes is used as a "seed set" for the route planning algorithm. In other words, the randomly generated routes are used to as initial routes for the route planning algorithm. In other words, the randomly generated routes are used to initiate the route planning algorithm.

In this embodiment, any appropriate route planning algorithm may be used to determine a route for the vehicle 2 between point A and point B e.g. such as those example route planning algorithms provided earlier above with reference to step s8 of FIG. 2.

Thus, a route within the area of terrain 4 from point A to B for the vehicle 2 is determined.

At step s48, the one or more routes for the vehicle 2 between point A and point B determined at step s46 are stored in the database 8. These stored routes may, for example, be used (as described later below with reference to steps s54 to s60) in future performances on the process of FIG. 6

At step s50, the route planner 5 may instruct the vehicle 2 to follow a route determined at step s46. For example, the route planner 5 may send information specifying a determined route to the vehicle 2.

At step s52, using the received instructions, the vehicle 2 may follow a determined route, thereby moving from point A to point B.

After step s52 the process of FIG. 6 may end.

Returning now to the case where, at step s42, it is determined that the database 8 does contain previously stored routes, at step s54 At step s54, from the one or more routes stored in the database 8 (i.e. which may have been stored in the database 8 during pervious, i.e. earlier, performances of the process of FIG. 6), the processor 6 selects one of the. In this embodiment, the processor 6 selects one or more route whose start and end points best match points A and B respectively.

Any appropriate selection algorithm may be used by the processor 6 to select one of the Pareto optimal set of routes.

At step s56, using the selected one or more routes (i.e. the one or more routes selected from those routes stored in the database 8 and whose start and end points most closely match points A and B respectively), the processor 6 performs a route planning algorithm to determine one or more routes (e.g. "optimal" routes relative to certain parameters) for the vehicle 2 between point A and point B.

In this embodiment, at step s46, the one or more routes selected at step s54 is used to form a "seed set" for the route planning algorithm. In other words, the one or more selected routes are used as initial routes for the route planning algorithm. In other words, the one or more selected routes are used to initiate the route planning algorithm. If further routes (i.e. in addition to those selected from those stored on the database 8) are required to initialise the route planning algorithm, these further initial route may be randomly generated.

In this embodiment, any appropriate route planning algorithm may be used to determine a route for the vehicle 2 between point A and point B e.g. such as those example route planning algorithms provided earlier above with reference to step s8 of FIG. 2.

Thus, a route within the area of terrain 4 from point A to B for the vehicle 2 is determined.

At step s58, the one or more routes for the vehicle 2 between point A and point B determined at step s56 are stored in the database 8. These stored routes may, for example, be used in future performances on the process of FIG. 6 (i.e. as a database of routes from which a seed set for the route planning algorithm may be selected).

At step s60, the route planner 5 may instruct the vehicle 2 to follow a route determined at step s56. For example, the route planner 5 may send information specifying a determined route to the vehicle 2.

At step s62, using the received instructions, the vehicle 2 may follow a determined route, thereby moving from point A to point B.

After step s62 the process of FIG. 6 may end.

Thus a further process of moving the vehicle 2 from point A to point B is provided.

The method described above with reference to FIG. 6 advantageously tends to provide that prior information (i.e.

previous solutions determined using the route planning algorithm) may be exploited. This prior information may advantageously be used as starting routes (i.e. a seed set of routes) for the route planning algorithm in future implementations of the algorithm. Using such routes as a seed set for a route planning algorithm advantageously tends to provide that the route planning algorithm determines an "optimal" route faster than if randomly routes were used as a seed set. In other words, the described methods and apparatus advantageously tend to increase the speed of optimization for a route planning algorithm, and therefore speed up the route planning process. This tends to be particularly, but not exclusively, the case in situations where the route planning problem is not evolving rapidly, i.e. when information from previous implementations of the route planning algorithm have some bearing on a current problem, i.e. when routes to be determined are between points that are relatively close to (or the same as) points between which a route has previously been determined.

The method described above with reference to FIG. 6 advantageously tends to be capable of exploiting knowledge about the broad geographic area in which a route is to be planned (i.e. the area of terrain 4) to determine routes which may be selected as a seed set of routes for the route planning algorithm (i.e. the aforementioned prior information). Furthermore, the methods described above with reference to FIG. 6 advantageously tend to be capable of exploiting knowledge about terrain characteristics of the area of terrain 4 to determine routes which may be selected as a seed set of routes for the route planning algorithm (i.e. the aforementioned prior information).

When determining a route between point A and point B, the methods described above with reference to FIG. 6 advantageously tend to use, as a seed set for the route planning, previously determined routes (i.e. previously solved route planning problems) with sufficient similarity (i.e. with sufficiently close start and end points). What is deemed to be "sufficiently close" may be dependent upon any appropriate criteria.

The above described method and apparatus advantageously tend to produce routes for the vehicle 2 that are closer to the Pareto optimal front for the route planning problem.

The embodiments described above with reference to FIGS. 2 to 4 may advantageously be combined with the embodiments described above with reference to FIG. 6. For example, in an initial implementation of the process of FIG. 6, the seed set for the route planning algorithm may be selected by performing steps s2 to s6 of the process of FIG. 2 (step s2 being described in more detail earlier above with reference to FIG. 3). Future implementations of the process of FIG. 6, the seed set for the route planning algorithm may be selected from routes stored in the database 8 (i.e. the set of routes provided by performing step s2, and those routes determined in previous performances of the process of FIG. 6).

In the above embodiments, the vehicle is an unmanned ground-based vehicle. However, in other embodiments, the vehicle is a different type of vehicle, for example a manned vehicle and/or an aircraft, or water-based vehicle. In other embodiments, there is a plurality of vehicles.

In the above embodiments, routes for the vehicle are planned with an area of terrain. This area of terrain may be "structured" (i.e. comprising roads etc that the vehicle must travel along) or "unstructured" (i.e. "open" terrain in which the vehicle may move anywhere). The terrain may comprise obstacles or terrain features that are to be avoided. The area of terrain may be bounded or unbounded. However, in other embodiments, the area within which the vehicle may move may be a different type of area. For example, the area may be, or may include, a region/volume of airspace, or a region of water.

The invention claimed is:

1. A method of determining a route for a vehicle by using a first route planning algorithm and a second route planning algorithm to achieve one or more objectives, the method comprising:
    providing a set of routes, each route in the set of routes being a pre-determined route from an identified starting location to an identified desired terminal location, each route in the set of routes having been determined using the first route planning algorithm, wherein the first route planning algorithm comprises:
        defining a plurality of points within a region, the region being a region within which the vehicle moves; and
        constructing, by one or more computer processors, a plurality of routes between the identified starting location and the identified desired terminal location via a plurality of segments, each segment connected to at least one of the defined points within the region,
        wherein at least two of the segments in each of the routes have equal lengths,
        wherein at least two of the equal length segments in a first route have a first angle with respect to a common bearing,
        wherein at least one of the equal length segments in a second route has the first angle of the first route with respect to the common bearing, and
        wherein at least one of the equal length segments in the second route has a second angle that is different from the first angle of the first route with respect to the common bearing; and
    acquiring, by the one or more computer processors, information specifying the identified starting location for the vehicle;
    acquiring, by the one or more computer processors, information specifying the identified desired terminal location for the vehicle;
    using the acquired starting location information and the acquired desired terminal location information, selecting, by the one or more computer processors, one or more routes from the provided set of routes, the selection of a route from the set of routes being dependent upon the identified starting location and the identified desired terminal location;
    using the acquired starting location information, the acquired desired terminal location information, and the selected one or more routes, performing, by the one or more computer processors, the second route planning algorithm to determine a route for the vehicle, the determined route for the vehicle being a route from the identified starting location to the identified desired terminal location, wherein the second route planning algorithm comprises performing an optimization process using the selected one or more routes as at least part of an initial set of routes for the optimization process, the optimization process being performed such that optimization is performed with respect to the one or more objectives; and
    determining, by the one or more computer processors, the route for the vehicle to achieve a solution to the one or more objectives, wherein:
the determined route for the vehicle comprises at least one of the constructed routes and at least one route that has been determined using the second route planning algorithm,
the first route planning algorithm and the second route planning algorithm are different route planning algorithms, and
the one or more objectives comprises at least one of: minimizing an amount of fuel that would be used by the vehicle to travel the determined route; minimizing an amount of time that would take the vehicle to travel the determined route; and minimizing a likelihood that the vehicle would be detected by an entity remote from the vehicle while following the determined route.

2. The method according to claim 1, the method further comprising providing, by the one or more computer processors, for use by the vehicle, information specifying the determined route for the vehicle.

3. The method according to claim 1, the method further comprising following, by the vehicle, the determined route for the vehicle.

4. The method according to claim 1, wherein each constructed route between a pair of defined points comprises a plurality of substantially straight route sections connecting the pair of defined points.

5. The method according to claim 4, wherein:
for each pair of the defined points, more than one route is constructed,
the first route planning algorithm further comprises, for the each pair of the defined points, selecting from the more than one route constructed for the pair of defined points, routes that are Pareto optimal with respect to one or more further objectives, and
the provided set of routes comprises the selected Pareto optimal routes.

6. The method according to claim 1, wherein selecting the one or more routes from the provided set of routes is performed such that each of the selected routes satisfies one or more criteria selected from the group of criteria consisting of: the criterion that the identified starting location of a selected route is closer to a specified starting location for the vehicle than the identified starting location for each unselected route, and the criterion that the identified desired terminal location of a selected route is closer to a specified desired terminal location for the vehicle than the identified desired terminal location for each unselected route.

7. A route planner for determining a route for a vehicle by using a first route planning algorithm and a second route planning algorithm to achieve one or more objectives, the route planner comprising:
a database configured to store a set of routes, each route in the set of routes being a pre-determined route from an identified starting location to an identified desired terminal location, each route in the set of routes having been determined using the first route planning algorithm, wherein the first route planning algorithm comprises:
defining a plurality of points within a region, the region being a region within which the vehicle moves; and
constructing a plurality of routes between the identified starting location and the identified desired terminal location via a plurality of segments, each segment connected to at least one of the defined points within the region,
wherein at least two of the segments in each of the routes have equal lengths,
wherein at least two of the equal length segments in a first route have a first angle with respect to a common bearing,
wherein at least one of the equal length segments in a second route has the first angle of the first route with respect to the common bearing, and
wherein at least one of the equal length segments in the second route has a second angle that is different from the first angle of the first route with respect to the common bearing; and
one or more computer processors operatively coupled to the database and configured to:
acquire information specifying the identified starting location for the vehicle,
acquire information specifying the identified desired terminal location for the vehicle,
select, using the acquired starting location information and the acquired desired terminal location information, one or more routes from the set of routes stored in the database, the selection of a route from the set of routes being dependent upon the identified starting location and the identified desired terminal location,
perform, using the acquired starting location information, the acquired desired terminal location information, and the selected one or more routes, the the second route planning algorithm to determine a route for the vehicle, the determined route for the vehicle being a route from the identified starting location to the identified desired terminal location, wherein the second route planning algorithm comprises performing an optimization process using the selected one or more routes as at least part of an initial set of routes for the optimization process, the optimization process being performed such that optimization is performed with respect to the one or more objectives, and
determine the route for the vehicle to achieve a solution to the one or more objectives,
wherein:
the determined route for the vehicle comprises at least one of the constructed routes and at least one route that has been determined using the second route planning algorithm,
the first route planning algorithm and the second route planning algorithm are different route planning algorithms, and
the one or more objectives comprises at least one of: minimizing an amount of fuel that would be used by the vehicle to travel the determined route; minimizing an amount of time that would take the vehicle to travel the determined route; and minimizing a likelihood that the vehicle would be detected by an entity remote from the vehicle while following the determined route.

8. The route planner according to claim 7, wherein the one or more computer processors are further configured to provide, for use by the vehicle, information specifying the determined route for the vehicle.

9. The route planner according to claim 7, wherein each constructed route between a pair of defined points comprises a plurality of substantially straight route sections connecting the pair of defined points.

10. The route planner according to claim 9, wherein:
for each pair of the defined points, more than one route is constructed,
the first route planning algorithm further comprises, for the each pair of the defined points, selecting from the more than one route constructed for the pair of defined points, routes that are Pareto optimal with respect to one or more further objectives, and
the provided set of routes comprises the selected Pareto optimal routes.

11. The route planner according to claim 7, wherein the one or more computer processors are configured to select the one or more routes such that each of the selected routes satisfies one or more criteria selected from the group of criteria consisting of: the criterion that the identified starting location of a selected route is closer to a specified starting location for the vehicle than the identified starting location for each unselected route, and the criterion that the identified desired terminal location of a selected route is closer to a specified desired terminal location for the vehicle than the identified desired terminal location for each unselected route.

12. A non-transitory computer program product encoding instructions that when executed by one or more computer processors cause a process to be carried out for determining a route for a vehicle by using a first route planning algorithm and a second route planning algorithm to achieve one or more objectives, the process comprising:
providing a set of routes, each route in the set of routes being a pre-determined route from an identified starting location to an identified desired terminal location, each route in the set of routes having been determined using the first route planning algorithm, wherein the first route planning algorithm comprises:
defining a plurality of points within a region, the region being a region within which the vehicle moves; and
constructing a plurality of routes between the identified starting location and the identified desired terminal location via a plurality of segments, each segment connected to at least one of the defined points within the region,
wherein at least two of the segments in each of the routes have equal lengths,
wherein at least two of the equal length segments in a first route have a first angle with respect to a common bearing,
wherein at least one of the equal length segments in a second route has the first angle of the first route with respect to the common bearing, and
wherein at least one of the equal length segments in the second route has a second angle that is different from the first angle of the first route with respect to the common bearing; and
acquiring information specifying the identified starting location for the vehicle;
acquiring information specifying the identified desired terminal location for the vehicle;
using the acquired starting location information and the acquired desired terminal location information, selecting one or more routes from the provided set of routes, the selection of a route from the set of routes being dependent upon the identified starting location and the identified desired terminal location;
using the acquired starting location information, the acquired desired terminal location information, and the selected one or more routes, performing the second route planning algorithm to determine a route for the vehicle, the determined route for the vehicle being a route from the identified starting location to the identified desired terminal location, wherein the second route planning algorithm comprises performing an optimization process using the selected one or more routes as at least part of an initial set of routes for the optimization process, the optimization process being performed such that optimization is performed with respect to the one or more objectives; and
determining the route for the vehicle to achieve a solution to the one or more objectives,
wherein:
the determined route for the vehicle comprises at least one of the constructed routes and at least one route that has been determined using the second route planning algorithm,
the first route planning algorithm and the second route planning algorithm are different route planning algorithms, and
the one or more objectives comprises at least one of: minimizing an amount of fuel that would be used by the vehicle to travel the determined route; minimizing an amount of time that would take the vehicle to travel the determined route; and minimizing a likelihood that the vehicle would be detected by an entity remote from the vehicle while following the determined route.

13. The non-transitory computer program product according to claim 12, the process further comprising providing, by the one or more processors, for use by the vehicle, information specifying the determined route for the vehicle.

14. The non-transitory computer program product according to claim 12, wherein each constructed route between a pair of defined points comprises a plurality of substantially straight route sections connecting the pair of defined points, wherein:
for each pair of the defined points, more than one route is constructed,
the first route planning algorithm further comprises, for the each pair of the defined points, selecting from the more than one route constructed for the pair of defined points, routes that are Pareto optimal with respect to one or more further objectives, and
the provided set of routes comprises the selected Pareto optimal routes.

15. The non-transitory computer program product according to claim 12, wherein selecting one or more routes from the provided set of routes is performed such that each of the selected routes satisfies one or more criteria selected from the group of criteria consisting of: the criterion that the identified starting location of a selected route is closer to a specified starting location for the vehicle than the identified starting location for each unselected route, and the criterion that the identified desired terminal location of a selected route is closer to a specified desired terminal location for the vehicle than the identified desired terminal location for each unselected route.

* * * * *